Sept. 24, 1957  A. U. AYRES  2,807,411
PROCESS OF CENTRIFUGALLY SEPARATING GLYCERIDES FROM OIL
Filed Oct. 6, 1954  4 Sheets-Sheet 1

Sept. 24, 1957 A. U. AYRES 2,807,411
PROCESS OF CENTRIFUGALLY SEPARATING GLYCERIDES FROM OIL
Filed Oct. 6, 1954 4 Sheets-Sheet 3

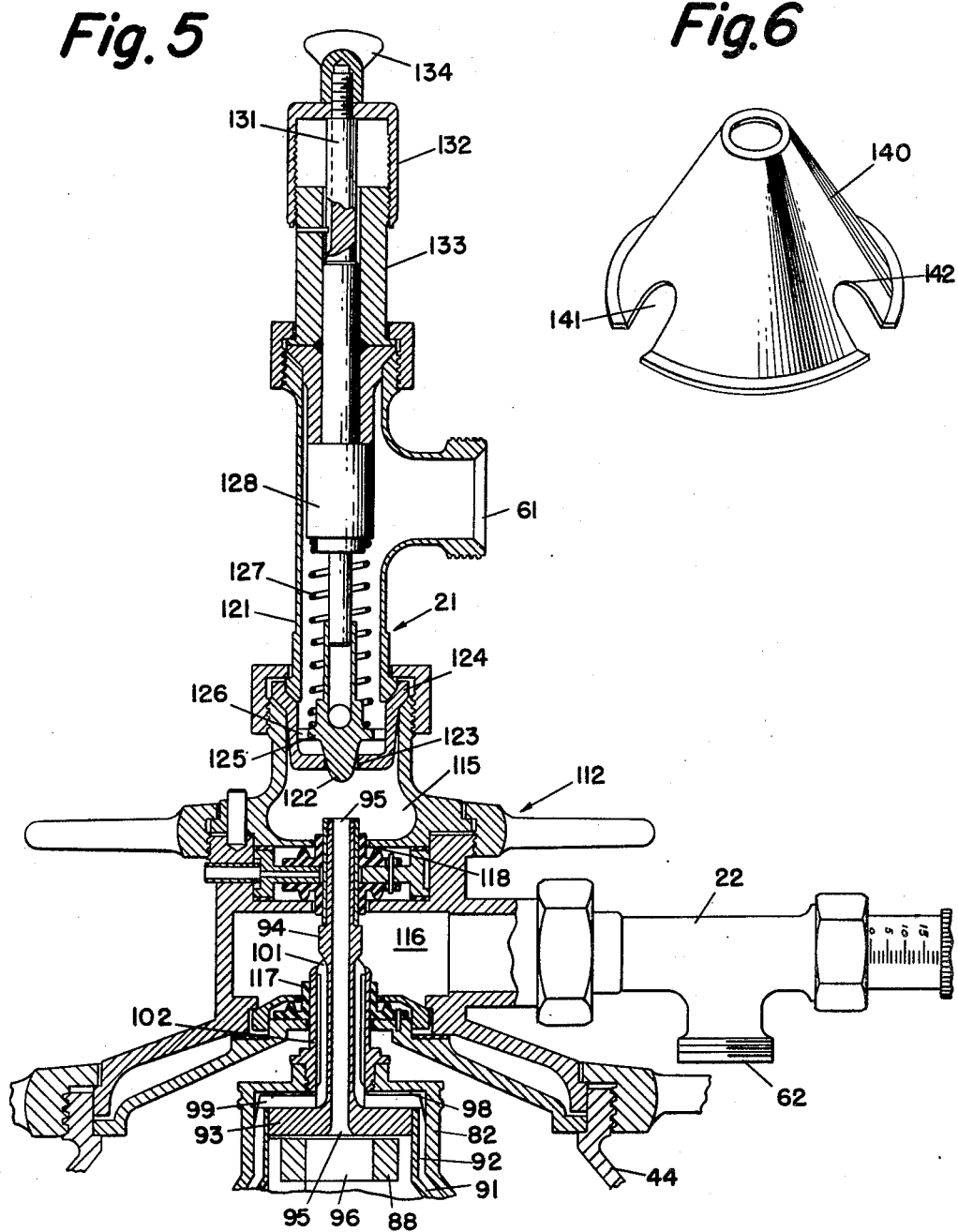

2,807,411
PROCESS OF CENTRIFUGALLY SEPARATING GLYCERIDES FROM OIL

Arthur U. Ayres, Philadelphia, Pa., assignor to The Sharples Corporation, a corporation of Delaware Application October 6, 1954, Serial No. 460,580

19 Claims. (Cl. 233—11)

This invention pertains to the winterization of glyceride oils. By winterization is meant the removal from the oils of higher melting substance such as higher melting glycerides and waxes naturally occurring therein. The term "winterization" is derived from the circumstance that such separation was originally carried out by simply allowing the oil to stand in outside tanks during the winter with the result that the higher melting substances settled out.

Glyceride oils and particularly vegetable oils, such as cottonseed oil, corn oil, soya bean oil, sesame seed oil, olive oil, sunflower seed oil, rape seed oil, and peanut oil, are used to a large extent in salad oils and salad dressings, and there is a distinct preference for vegetable oils which will not become cloudy or solidify when placed in a household refrigerator, which normally provides food storage temperatures of from 40 to 45° F. An oil which becomes solid in a refrigerator is inconvenient to handle since it cannot be poured from its container. A mayonnaise salad dressing made from such an oil, if kept in a refrigerator, will suffer a breakdown of its emulsion due to crystallization of the oil. While these shortcomings are not possessed by an oil which merely becomes cloudy when in a refrigerator, the housewife has a natural preference for an oil which will remain clear.

Cottonseed oil and peanut oil are particularly susceptible to clouding and solidification at ordinary refrigerator temperatures due to the presence of high melting substances, e. g. glycerides, referred to for convenience as "stearine." While corn oil and soya bean oil are not particularly susceptible to solidification, clouding is frequently produced at refrigerator temperatures due to the presence of higher melting waxes.

Glyceride oils derived from animal sources are also winterized, e. g., fish oils used in coating compositions, such as paints, the purpose being to remove relatively saturated glycerides to improve the drying of the oils to hard, non-tacky films. Examples are sardine oil and pilchard oil. Medicinal oils, such as cod liver oil, are frequently winterized to avoid the production of cloud at low temperatures.

The problem of winterizing glyceride oil resolves itself principally into a matter of removing the higher melting substances from the oil, which heretofore has been attended by considerable difficulties and inconveniences. The oil is quite viscous at the relatively low temperatures required for crystallization or other solidification of the higher melting substances, and due to this fact such substances exhibit a reluctance to grow into well-formed particles of a size suitable for filtration, such as by use of a filter press. The oil must be cooled very slowly in order to produce filterable particles, and even under the most favorable circumstances the final separation of solids and liquid is difficult and incomplete. Moreover, extraordinarily large filter capacity is required as compared with ordinary filtering operations, due to the soft and slippery nature of the solids which readily clog the pores of the filter cloths. Low pressures must be used during the filtration, since the use of high pressure would compress the filter cake and render it impermeable to the passage of oil. Furthermore, frequent shutting down of the presses is required for cleaning purposes with attendant difficulties and inconveniences. After the filter cake is removed from the press, the cloths of the latter must be heated to melt and remove the solid particles clogging their pores, and the consequent heating of the metal frames of the presses is undesirable because they must be cooled again prior to the next filtering operation.

It is customary to conduct the winterizing operation in refrigerated rooms, although the chilling tanks may be housed outside at atmospheric pressure and provided with refrigerating coils, if the tanks are closed and well insulated. Quick chilling must be avoided to produce filterable solid particles.

Many efforts have been made heretofore to substitute continuous centrifugal separation for filtration, but without success, due in large part to the inability of continuously discharging from the centrifuge rotor a continuous stream of solids of sufficiently low oil content, and a continuous stream of oil sufficiently denuded from high melting substances.

I have discovered that chilled glyceride oil having present solid high melting substances may be continuously separated into a solid phase and a liquid phase by feeding the same under pressure to a centrifuge operating on the full bowl principle, i. e., with the bowl completely filled with the substances undergoing separation, and applying sufficient pressure to the feed to, in effect, extrude the solid phase from the centrifuge bowl. Separation of the solids from the oil is by stratification, and the hydrostatic pressure developed on the separated solids in the bowl, which solids are of higher density than the oil, assists to an extent in the continuous extrusion of the solids from the rotor with substantially constant and reduced oil content.

In the practice of my new process I prefer to employ cooling about the bowl, or a portion thereof such as about the inlet portion, to assist in the separation of solidified high melting substances from the oil. After such substances are separated in the bowl, I find it desirable, particularly at relatively low temperatures to raise the temperature about the discharge path of the solids from the bowl above the temperatures at which the separation is effected to render the solids more flowable and thus to assist in the discharge thereof from the bowl.

The separation of the solids from the chilled oil, which, due to the chilling, is relatively highly viscous, may be substantially facilitated by subjecting the chilled mass to flash heating prior to centrifuging, thereby reducing the viscosity of the oil without substantial melting of the solids.

While my process is excellently adapted to the separation of the solids from an oil mass chilled in the ordinary way, the development of filterable solid particles therein is not a necessity, making it possible to increase the rate of chilling, even though relatively smaller solid particles may be produced. In fact, my process lends itself to completely continuous operation wherein a stream of oil is subjected to continuous chilling and then to centrifugation, with or without flash heating for purposes of viscosity reduction.

If desired the viscosity of the chilled oil may be reduced in other ways such as by mixing a solvent which is preferably inert to the oil during treatment, into the oil, e. g., before, during and/or after chilling, but prior to centrifugation. Suitable solvents for this purpose are hydrocarbon solvents, such as hexane, polar solvents, such as acetone, or a mixture of the two. Polar solvents include ketones, aldehydes, esters, alcohols, such as methyl, ethyl, and isopropyl alcohol. Hydrocarbons include n-hexane, benzene, n-pentane, n-heptane, isohexane, neohexane and isoheptane. Any desired percentage of solvent may be present in the oil, such as from 5% to 400 or 500% by weight based on total oil including its contained high melting substances. Miscellae resulting from the extraction of glyceride oils from naturally occurring substances containing the same by the use of solvent are excellently adapted for treatment by my process, with or without concentration or further dilution.

While any desired centrifugal force may be employed, I prefer to employ centrifugal forces of at least 5000 times gravity determined at the inner periphery of the bowl at its greatest inner radius, and particularly at least 8000 times gravity so determined. Outstanding results are obtained when the foregoing centrifugal force is at least 10,000 times gravity.

Further features of the invention will become apparent to persons skilled in the art as the specification proceeds and upon reference to the drawings in which:

Figure 5 is an elevation partly in section illustrating a manner of removing the separated phases from the centrifuge rotor; and Figure 6 is a perspective view of a modified centrifuge disc.

Figure 1:
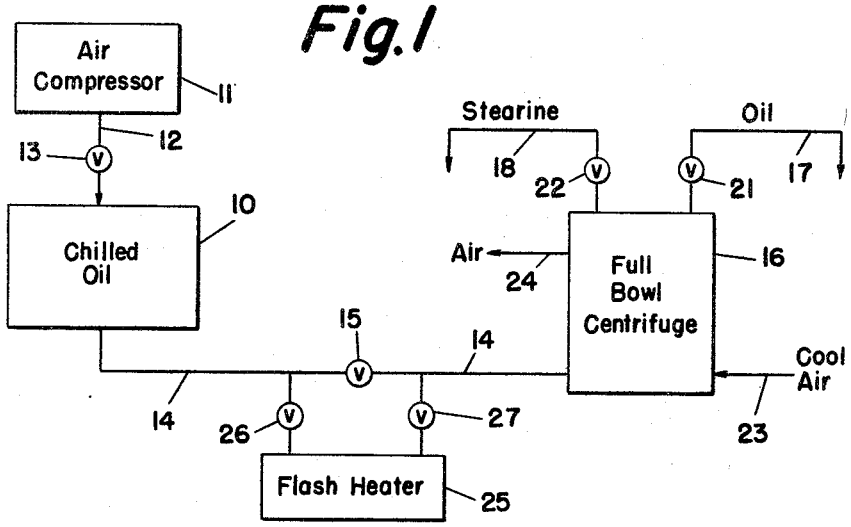
Figure 1 is a flow diagram illustrating one form of the invention.

Referring now to Figure 1, at 10 is shown a container for chilled oil. Chilled oil, e. g., at a temperature between 30° F. and 45° F., from container 10, flows, by virtue of air pressure applied to said container by air compressor 11 through line 12 controlled by valve 13, through line 14 and valve 15 to centrifuge 16 wherein the oil is separated from the higher melting substances, the oil flowing off as indicated at 17 and the higher melting substances flowing off as indicated at 18 and labeled for convenience as "stearine." Any other means may be employed to cause the flow of oil under pressure such as a pump. The flow through line 17 is indicated as being controlled by a valve 21, and the flow through line 18 is indicated as being controlled by a valve 22.

For purposes of cooling the rotor of the centrifuge 16, if desired, cool air is indicated at 23 as entering the lower part of the centrifuge casing, and this air, after passing about the centrifuge rotor, is indicated as leaving the centrifuge casing at 24.

Alternatively the chilled oil may be caused to pass through flash heater 25 by closing valve 15 and opening valves 26 and 27, or a part of the chilled oil may be caused to flow directly to centrifuge 16 through valve 15, and a part through valves 26 and 27, and flash heater 25, the openings in valves 15, 26 and 27 being adjusted to obtain any desired division of flow.

Figure 2:
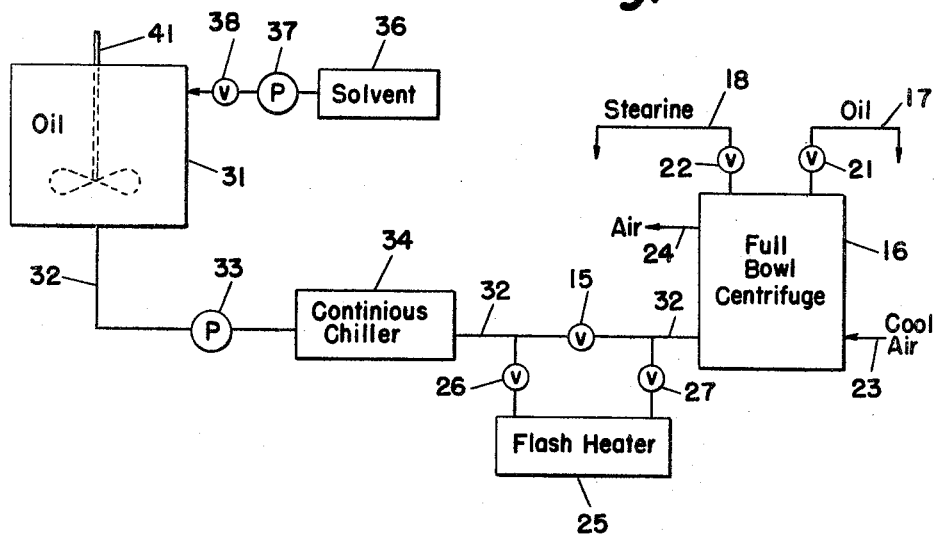
Figure 2 is another flow diagram illustrating another form of the invention.

In Figure 2 the elements referred to by numerals 15 through 27 in Figure 1 are duplicated, and the elements referred to in Figure 1 by numerals 11 to 14 are substituted by container 31, line 32, pump 33 and continuous chiller 34, line 32 being connected to centrifuge 16 through valve 15, and/or through valves 26 and 27 and flash heater 25, the same as line 14 in Figure 1.

Oil flows from container 31, through line 32, and pump 33 to continuous chiller 34, wherein the oil is cooled, such as to between 30° F. and 45° F., e. g., 42° F., to cause separation from solution of higher melting substances present in the oil. The oil then flows to centrifuge 16 through valve 15, and/or through valve 26, flash heater 25, and valve 27, for separation of the oil from the solid higher melting substances the same as in Figure 1, cooling air, if desired, being introduced into the centrifuge casing at 23 and leaving the casing at 24, or vice versa.

If desired, the oil in container 31 may be diluted with solvent to reduce its viscosity when in chilled condition, which reduction in viscosity assists in separating the solid higher melting substances from the oil in the centrifuge 16. As illustrated, solvent flows from container 36 through pump 37 and valve 38 to container 31 to dilute the oil in container 31. The oil may be diluted to any degree desired, for instance by the introduction into container 31 of from 5 to 400% by volume of solvent based on the original oil. Mixing of solvent with the oil is assisted by the rotation of the agitator 41.

As brought out above, centrifuge 16 operates on the full bowl principle, and in the practice of the present invention the feed of the chilled oil to the centrifuge is under pressure, this pressure serving not only to keep the bowl or rotor full, but also to drive separated solids from the bowl, the hydrostatic pressure of the oil, which is of lower density, on the surface of the separated solids assisting in this respect.

Feed pressures of 10 pounds to 200 pounds per square inch are illustrative, although I prefer to operate with feed pressures between 25 pounds and 100 pounds per square inch.

The position of the interface between the separated solids and oil in the bowl is influenced by the particular design and construction of the bowl, and may be adjusted by means of valve 21 and/or valve 22 in accordance with desired conditions. Partially closing valve 21 so as to introduce a greater resistance to the discharge of oil from the centrifuge will cause the interface to seek a new position radially outward from that normally sought, and partially closing the valve 22 to introduce a greater resistance to the discharge of solids will cause the interface to seek a new position radially inward from that normally sought. Partial closing of both valves introduces a greater resistance to the discharge of both phases, making possible the use of higher feed pressures for a given rate of flow with resultant greater pressures in the bowl on the respective phases, while at the same time permitting adjustment of the position of the interface. As to the solids phase, this assists in its extrusion from the bowl with very low oil content, as does partial closing of the valve 21.

While the interface may be in any desired position consistent with the results sought, I prefer to adjust valves 21 and/or 22 to position the interface radially outward from its position in ordinary separations such as at a position falling between 70% and 90% of the greatest radial distance between the axis of rotation and the inner periphery of the bowl. In the case of a centrifuge employing discs, I prefer to position the interface adjacent the outer edges of the discs, e. g., outwardly from said outer edges to reduce or avoid any possible clogging of the spaces between the discs, and/or to provide a fairly continuous path of flow in the bowl separated solids which are subjected to the pressures above referred to.

Figure 3:
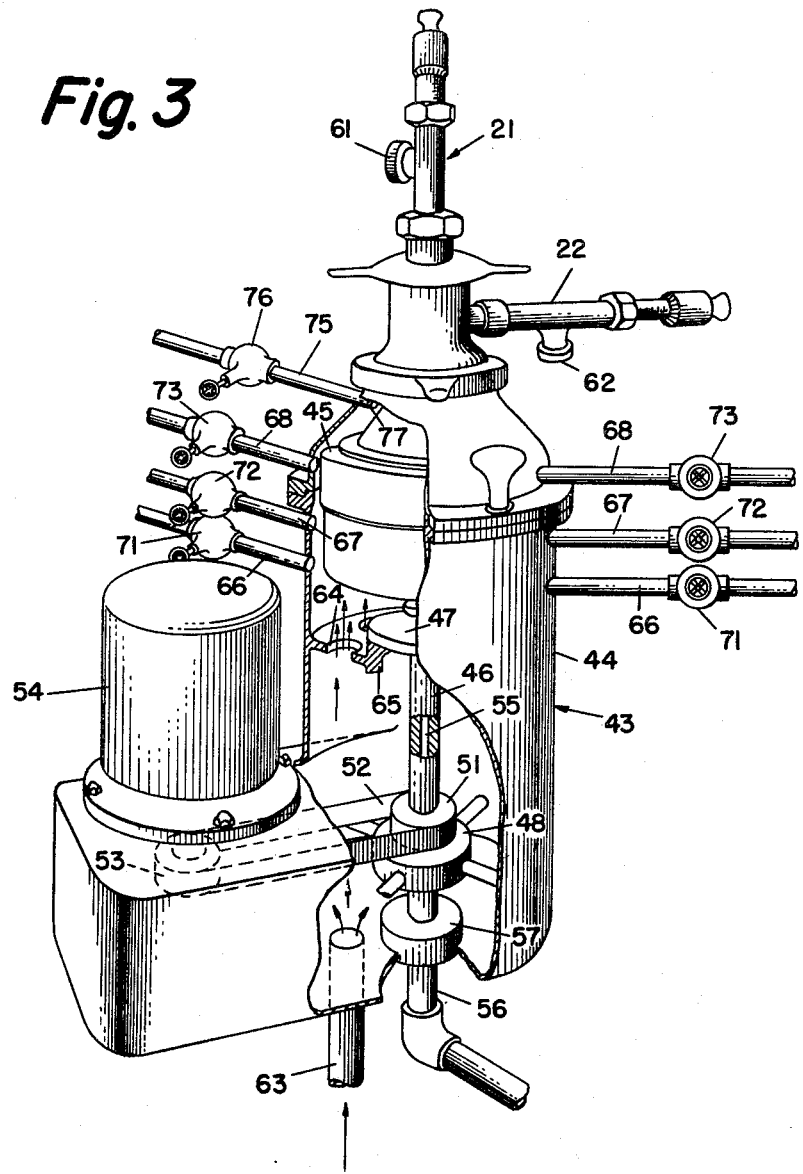
Figure 3 is a perspective view, shown broken, of a centrifuge which may be employed in the practice of the invention.

Although any suitable centrifuge construction may be employed, a centrifuge particularly adapted to the practice of my invention is illustrated at 43 in Figure 3. Centrifuge 43 is illustrated as comprising an outer enclosing casing 44 within which is positioned a rotor 45 mounted upon a spindle 46, the latter in turn being mounted in bearings 47 and 48, and driven by any suitable means, such as by pulley 51, fixed to spindle 46, and belt 52, which belt is driven by pulley 53 attached to an electric motor 54. Any other suitable driving means may be substituted.

Spindle 46 is provided with an interior channel 55 for the feed of chilled oil into the rotor 45, the feed being through a stationary pipe 56 having a fluid connection with the lower end of spindle 46 through a seal 57 which permits the chilled oil to flow from stationary pipe 56 into channel 55 of rotating spindle 46 without substantial leakage. Seal 57 may be of any desired construction, several different types being well known in the art.

Separated oil is discharged from centrifuge 43 through outlet 61 of valve 21, and separated solidified higher melting substances are discharged from centrifuge 43 through outlet 62 of valve 22. Valves 21 and 22 are stationary, i. e., they do not revolve with the rotor 45, and are connected thereto through appropriate seals to avoid substantial leakage.

I prefer to cool at least a portion, e. g., the lower portion, of rotor 45 when in operation. This may be accomplished by any suitable means, for example, by introducing cool air, such as at a temperature between 20° F. and 60° F., and depending upon the extent of cooling desired, into casing 44, e. g., through pipe 63. This cooled air travels up through casing 44 about spindle 46, through openings 64 in bearing support 65 and up to and about at least a portion of rotor 45. Also depending upon the desired amount and/or desired locus of cooling of rotor 45, this air may be taken off through any one or more of the vertically spaced air outlets 66, 67 and 68, controlled by valves 71, 72 and 73, respectively. While I have illustrated two such outlets spaced circumferentially at a given vertical level, it is to be understood that any number may be employed, e. g., one or more. Likewise any desired number of vertically spaced outlets may be employed, e. g., one or more.

While inlet 63 and/or outlets 66, 67 and/or 68 may be provided with pumps or other means for the circulation of air through the casing 44, I find that the windage characteristics of a centrifuge rotor, which cause it to function much like an air pump, are sufficient to cause the air to be sucked in through the inlet 63 and to be discharged through any one or more of outlets 66, 67 and 68, as desired, upon control of valves 71, 72 and 73, respectively. While outlets 66, 67 and 68 are shown positioned opposite the portion of the wall of rotor 45 of greatest radial diameter, and are shown spaced not only axially of said portion but also circumferentially thereof, outlets 66 being positioned adjacent the lower end of said portion, outlets 68 being positioned adjacent the upper end thereof, and outlets 67 occupying an intermediate position, it is to be understood that any other number and/or position of air outlets may be employed.

Since in a centrifuge rotor the solid phase, after separation, is eventually segregated from the liquid phase for purposes of discharge, I find it at times helpful, to warm this portion of the centrifuge rotor to assist the flow of the solids phase, particularly when relatively low temperatures of separation are employed. When the portion of the rotor utilized for separation is subjected to cooling, this warming does not interfere materially with said separation.

Any means may be employed for warming the path of flow of the segregated solids. A highly effective means, when employing a rotor of the type illustrated, comprises introducing warmer air, e. g., air at room temperature or above, into the casing 44 through pipe 75, controlled by valve 76 and having an outlet 77 positioned opposite a portion of the bowl of reduced radial outer diameter and through which the segregated solids phase flows. Due to the pumping characteristics of the bowl, warmer air introduced as described will be sucked into the casing 44 and discharged for the most part through the nearest outlets, e. g., through the outlets 68. Warmer air may be otherwise circulated such as by means of a fan, pump, pressure tank, etc., with or without the use of baffles or similarly functioning structure to segregate the warming medium from the cooling medium.

Thus by subjecting the inlet end of the rotor to cooling, the solids phase is kept harder and more easily separable from the oil, whereas by warming the outlet end of the rotor, the solids phase is rendered softer, and more easily flowable, and therefore more easily discharged from the rotor.

While the warming of the outlet end of the rotor is helpful in discharging therefrom the solids phase, particularly when the temperatures of separation are so low as to produce a solids phase of a hard or viscous character, I have found that, with a rotor of the type illustrated, such warming is by no means an essential, particularly at relatively higher temperatures such as 42° F., and in fact I have operated very successfully by introducing the cooling fluid, e. g., cooled air, into the casing 44 at a point located similarly to the outlet 77 of pipe 75, the cooled air escaping from the casing 44 through outlets positioned similarly to the outlets 66 and 67.

Rotor 45 may be of any construction suitable for full bowl operation. I prefer, however, to employ disc bowl 80 shown in Figure 4.

Figure 4:
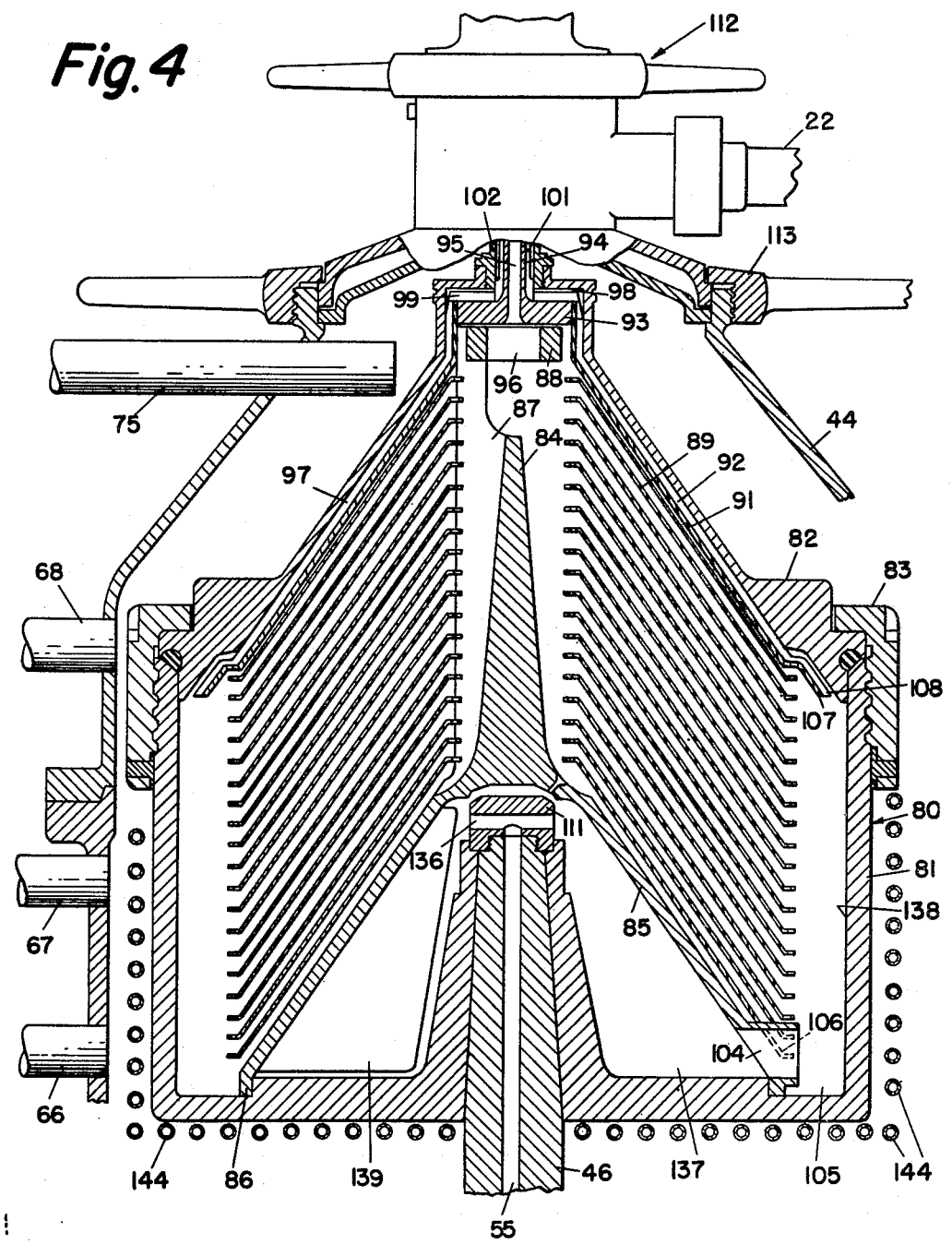
Figure 4 is an elevation partly in section illustrating a centrifuge rotor with appurtenances.

Referring now more particularly to Figure 4, at 81 is shown a bowl shell to which is secured bowl top 82 by means of a flanged screw illustrated at 83. Bowl 80 is provided with a center post structure 84 having a conical lower portion 85 which engages a shoulder 86 in the bottom of shell 81, as illustrated. Center post 84 is provided with a plurality of circumferentially spaced wings 87 secured together at their tops by means of a ring 88, e. g., by welding, and which are engaged in a conventional way by a plurality of spaced discs 89 through the medium of slots at the inner ends of said discs.

A dividing cone 91, having a plurality of circumferentially spaced vanes 92, is positioned above the spaced discs 89, and the components of the bowl are held in assembled position vertically of the bowl by virtue of the engagement of vanes 92 by bowl top 82.

Dividing cone 91 is provided with a top 93 having an upwardly projecting cylindrical extension 94 within which is an axially positioned channel 95 which extends down through top 93. Channel 95 communicates with the interior of the bowl through center opening 96 in ring 88.

By virtue of the circumferential spacing of the vanes 92 on the top of dividing cone 91, a plurality of circumferentially spaced channels 97 are provided between the dividing cone 91 and the top 82 of the bowl. Channels 97 connect with a plurality of circumferentially spaced radial channels 98, the spacing of radial channels 98 being effected by the use of a plurality of circumferentially spaced radial vanes 99. Radial channels 98 communicate with vertical channel 101 positioned between the exterior of extension 94 and the interior of upwardly extending tubular portion 102 secured to the top of bowl top 82.

Channel 95 is in flow communication with outlet 61 of valve 21, and channel 101 is in flow communication with outlet 62 of valve 22.

Conical portion 85 of the center post 84 is provided at its lower end with a plurality of circumferentially spaced tubular extensions 104 which extend outwardly into and are in flow communication with space 105 between the outer edges of the discs 89 and the inner peripheral wall of shell 81, the lowermost discs 89 being provided with slots so as to fit about extensions 104 as illustrated at 106.

Dividing cone 91 is preferably provided with an extension illustrated at 107, extending outwardly and downwardly into the space 105, such extension preferably being provided with corresponding extensions of vanes 92 as illustrated at 108.

Bowl shell 81 is secured to spindle 46 by means of a nut 111 as illustrated.

Outlet valve and seal assembly 112 to be hereinafter more particularly described is secured to the top of casing 44 by means of flanged nut 113.

Valve and seal assembly 112 may be of any desired construction and operation, its function having been already described. A valve and seal assembly excellently suited for the purpose is illustrated in Figure 5.

Referring now more particularly to Figure 5, it will be noted that channel 95 discharges into a chamber 115, and that channel 101 discharges into a chamber 116. A seal assembly to prevent leakage downwardly out of chamber 116 is illustrated as being positioned around tube 102 at 117, and a seal assembly to prevent leakage between chambers 115 and 116 is illustrated as being positioned about extension 94 at 118. Any suitable seal assembly may be employed for the purpose, the particular seal assembly illustrated being more particularly described and claimed in U. S. Patent No. 2,554,622 to Jones, dated May 29, 1951.

Likewise valves 21 and 22 may be of any desired construction and operation which may be the same for each valve or different, any conventional valve capable of being adjusted to regulate the flow therethrough being suitable for the purpose. I prefer, however, to employ an adjustable spring pressed valve such as illustrated at 121, for reasons to be hereinafter more particularly described.

Valve 121 comprises a spring pressed movable closure member 122 which cooperates with a corresponding opening 123 in in member 124. Member 122 is provided with a guide 125 containing circumferentially spaced holes 126 to permit the flow to pass the member 122. Spring 127 engages member 122 and in turn is held under tension by member 128 which is engaged by stem 131. Stem 131 is engaged by interiorally threaded cap 132 mounted on threaded member 133, compression of spring 127 being adjusted by turning cap 132. After the desired adjustment is obtained, cap 132 is held in locked position by tightening lock nut 134.

As pointed out above, valve 22 may be of the same construction.

In operation of the apparatus shown in Figures 4 and 5, chilled glyceride oil is fed under pressure up through the channel 55 in spindle 46, and passes through channel 136 in nut 111 into chamber 137. In chamber 137 the rotation of the oil is accelerated by a plurality of circumferentially spaced radial vanes 139 secured to the wall of conical portion 85, and the oil flows through extensions 104 into space 105 wherein the bulk of the solidified higher melting substances are separated and deposited upon inner wall 138 of bowl shell 81. The oil passes inwardly through the spaces between discs 89 wherein the remainder of the solidified higher melting substances are separated and flow outwardly to join the previously separated solids. The oil continues inwardly toward the axis of rotation and flows upwardly through channel 95 into chamber 115. The pressure on the oil, due to the feed pressure, is sufficient to cause the oil to escape through valve 21 against the adjusted back pressure exerted by spring 127, and is delivered through outlet 61.

The solids, on the other hand, are compressed against inner wall 138 of bowl shell 81 with consequent squeezing out of oil, and due to the combined pressures of the feed and of centrifugal force (on both the oil and the solids), are caused to flow upwardly into channels 97, laterally through channels 98 and upwardly through channel 101 into chamber 116. From chamber 116 the solids flow through valve 22 and are delivered through outlet 62. As pointed out above, valve 22 may be of the same construction as valve 21, either valve being adjustable to provide the desired back pressure in its respective stream for purposes not only of adjusting the position of the interface between solids and liquid in the bowl, as desired, but also to regulate the rate of discharge of the respective phases, through adjustment of the respective net discharge pressure on either or both phases, to cause the solids to be extruded from the bowl substantially free of oil, and the oil to be discharged from the bowl substantially free of solids. The valve structure illustrated at 121 is particularly suitable in the discharge line for the solids phase, for clogging at the valve will increase the pressure on the solids, resulting in a sufficient depression of spring 127 to open the valve further and thus permit the solids to pass.

The cooling of the bowl or of portions thereof for the dissipation of heat increases the efficiency of separation to a remarkable degree.

Glyceride oil, e. g., cottonseed oil, which is known to contain a relatively high proportion of high melting substances, can be so efficiently denuded of higher melting substances by a single treatment in accordance with my process, even though the oil is chilled to only 42° F., as to far more than meet the standard accepted test for a winterized oil, namely, storage at 32° F. for 5½ hours without the appearance of any clouding in the oil.

While the bowl particularly described is capable of operating over long periods of time without tendency to clog due to the accumulation of higher melting substances in the narrower passages, e. g., between the discs, it is to be understood that bowls of any other design and construction and capable of operating on the full bowl principle may be substituted, particularly if provision is made by the application of well known engineering principles to alleviate or prevent tendencies to clog. Thus when employing a disc-type bowl having the conventional feed channels passing upwardly through the discs intermediate their inner and outer edges, I prefer to place slots in the discs of the same width as the feed channel and extending from the feed channel out to the outer edge of the discs as illustrated at 141 in disc 140 shown in Figure 6. As is well known, feed channels for a disc stack comprise merely vertically alined holes in the superimposed discs, the inner edge of a single hole in a disc being represented at 142 in Figure 6. All or a portion only of the discs may contain such slots, such as alternate discs and/or the lower discs in the stack such as the lower 5% to 40% of the total discs, e. g., 25%. Other arrangements of slotted and unslotted discs are contemplated. Thus every third or fourth disc may be slotted, or two or more slotted discs may be interposed between pairs of unslotted discs, as will be readily understood by persons skilled in the art upon becoming familiar herewith. Another expedient to alleviate or prevent clogging is to increase the height of the vertical spaces between the discs. Any other expedient for this purpose may be substituted.

Dilution of the glyceride oil prior to, during and/or after chilling with a solvent for the oil, which solvent preferably is inert under the conditions and in the environment of the treatment, also greatly facilitates separation of the solids from the chilled oil, among other things, by reducing its viscosity, and irrespective of the manner in which such dilution is effected. Thus my process is excellently adapted to the winterizing of miscellae obtained in the solvent extraction of glyceride oil bearing substances to extract the oil therefrom, such as of seeds, nuts, kernels and other fruits of plants, and of animal matter.

Likewise, flash heating of the chilled oil, preferably in the form of a flowing stream and immediately prior to centrifuging, also greatly facilitates the separation of solids from the chilled oil, e. g., by reducing its viscosity, and while usually practiced without dilution of the oil with a solvent, it may be practiced in any desired combination therewith.

Chilling of the oil may be accomplished in any desired manner. In prior practice this is usually effected by the use of insulated chilling tanks provided with cooling coils, or by placing the tanks in a room held at reduced temperature, and wherein the customary filter press operations are conventionally conducted to reduce the temperature of the presses. My invention makes possible the elimination of such presses, and is excellently adapted for practice in such cooled rooms, if desired, in which case room air may be employed with or without additional chilling, as desired, for the cooling of the centrifuge bowl. In addition, when my invention is so practiced, the frame and other centrifuge parts are held at reduced temperature which facilitates the cooling of the bowl, it being understood that a centrifuge bowl, when in operation, has a distinct tendency to rise in temperature, e. g., due to air friction and other dissipation of energy inherent in its operation. Moreover, when a normally gaseous solvent is employed for dilution of the oil, i. e. a solvent which is in the gas phase at ordinary room temperatures and atmospheric pressures, e. g., the normally gaseous hydrocarbons, such as ethane, propane, the various butanes and/or certain pentanes, a part or all of the chilling of the oil may be accomplished by release of pressure on the solvent-oil mixture to cause a part or all of the solvent to evaporate with consequent cooling of the liquid phase, e. g., the oil or the mixture of solvent and oil.

While I have illustrated one means for cooling the bowl while in operation, it is understood that any other means may be substituted, for example, by providing cooling coils about the periphery of the bowl as illustrated at 144 in Figure 4, and with or without the use of other cooling means, e. g., the use of cooled air or other gas.

Having particularly described my invention, it is to be understood that this is by way of illustration, and that changes, omissions, additions, substitutions and/or modifications may be made without departing from the spirit thereof. Accordingly it is intended that the patent shall cover by suitable expression in the claims the various features of patentable novelty which reside in the invention.

I claim:

1. A process for winterizing glyceride oil which comprises feeding under pressure to a centrifuge having a bowl operating on the full bowl principle a glyceride oil chilled to the extent of producing solid particles of higher melting substances therein, said solid particles in the chilled oil being of higher density than the chilled oil and the feed pressure being at least sufficiently high to maintain said bowl completely full, separating said solid particles from the oil by centrifugal force in said bowl, and discharging from said bowl by virtue of the feed pressure and the centrifugal force developed in said bowl the solids separated therein.

2. The process of claim 1 wherein the feed pressure is between 10 and 200 pounds per square inch.

3. The process of claim 2 wherein the feed pressure is between 25 and 100 pounds per square inch.

4. The process of claim 1 wherein cooling is applied to the exterior of the bowl.

5. The process of claim 4 wherein the cooling is applied about the inlet portion of the bowl.

6. The process of claim 5 wherein the temperature about the discharge path in the bowl of segregated solids is raised above the temperature at which the solids are separated in the bowl.

7. The process of claim 4 wherein the exterior of the bowl is cooled by contacting the same with cooled air.

8. The process of claim 7 wherein the temperature of the air is maintained between 20° F. and 60° F.

9. The process of claim 1 wherein the chilled oil is between 30° F. and 45° F.

10. The process of claim 1 wherein the chilled oil is subjected to flash heating prior to centrifugation.

11. The process of claim 1 wherein the chilled oil is diluted with solvent.

12. The process of claim 11 wherein the oil is diluted with between 5% and 400% of solvent based on original oil.

13. The process of claim 1 wherein the interface between the oil and solids in the centrifuge is positioned between 70% and 90% of the greatest radial distance between the axis of rotation of the bowl and the inner periphery thereof.

14. The process of claim 13 wherein the bowl is a disc bowl and the interface is positioned adjacent the exterior of the discs.

15. The process of claim 1 wherein extrusion of the solids phase from the bowl is assisted by subjecting each discharging stream to back pressure with increase in feed pressure.

16. A continuous process for the winterizing of glyceride oil which comprises chilling a continuously flowing stream of said oil to produce solid particles of higher melting substances therein, the solid particles in the chilled stream being of higher density than the oil therein, feeding the chilled stream to a centrifugal zone under a pressure at least sufficiently high to maintain said centrifugal zone completely full, separating the solid particles from the oil in said centrifugal zone by centrifugal force, and discharging from said centrifugal zone by virtue of said feed pressure and centrifugal force the solids separated therein.

17. The process of claim 16 wherein the stream of oil is diluted with solvent.

18. The process of claim 16 wherein at least a part of the oil is subjected to flash heating after chilling but before centrifugation.

19. The process of claim 1 wherein the oil is one of a group of oils consisting of cottonseed oil and peanut oil.

References Cited in the file of this patent

UNITED STATES PATENTS

| | | |
|---|---|---|
| 1,381,705 | Hapgood | June 14, 1921 |
| 2,205,381 | Eckey et al. | June 25, 1940 |
| 2,450,235 | Gee | Sept. 28, 1948 |
| 2,682,550 | Young et al. | June 29, 1954 |
| 2,705,407 | Colonna | Apr. 5, 1955 |

OTHER REFERENCES

Perry: "Chemical Engineers Handbook," 34d. ed., published by McGraw-Hill (N. Y.) 1950, page 372 relied on. (Copy in Div. 63.)